United States Patent
Bieler et al.

(10) Patent No.: US 9,124,206 B2
(45) Date of Patent: Sep. 1, 2015

(54) METHOD AND ARRANGEMENT FOR DETERMINING THE POSITION OF A ROTOR IN A BRUSHLESS MOTOR OR IN STEPPER MOTOR

(75) Inventors: Thierry Bieler, Echichens (CH);
Christian Fleury, Bellerive (CH);
Christian Koechli, Yvonnand (CH);
Laurent Cardoletti, Villeneuve (CH);
Simon Tinguely, Chésopelloz (CH)

(73) Assignee: MICRO-BEAM SA, Yverdon les Bains (CH)

( * ) Notice: Subject to any disclaimer, the term of this patent is extended or adjusted under 35 U.S.C. 154(b) by 800 days.

(21) Appl. No.: 13/397,981

(22) Filed: Feb. 16, 2012

(65) Prior Publication Data

US 2012/0146626 A1 Jun. 14, 2012

Related U.S. Application Data

(63) Continuation of application No. PCT/EP2010/062538, filed on Aug. 27, 2010.

(51) Int. Cl.
*H02P 6/18* (2006.01)

(52) U.S. Cl.
CPC ............... *H02P 6/185* (2013.01); *H02P 6/182* (2013.01)

(58) Field of Classification Search
CPC .......... H02P 6/182; H02P 6/18; H02P 25/023
USPC ............ 318/400.32, 400.33, 400.34, 400.35, 318/400.36
See application file for complete search history.

(56) References Cited

U.S. PATENT DOCUMENTS

| | | | | |
|---|---|---|---|---|
| 4,446,406 A | * | 5/1984 | Uzuka | 318/400.04 |
| 4,450,396 A | | 5/1984 | Thornton | |
| 4,712,050 A | * | 12/1987 | Nagasawa et al. | 318/400.04 |
| 5,254,914 A | * | 10/1993 | Dunfield et al. | 318/400.34 |
| 5,448,149 A | | 9/1995 | Ehsani et al. | |
| 6,555,977 B1 | | 4/2003 | Du et al. | |

FOREIGN PATENT DOCUMENTS

GB 2 455 123 A 6/2009

OTHER PUBLICATIONS

International Search Report dated Nov. 2, 2011 as received in application No. PCT/EP2010/062538.

* cited by examiner

*Primary Examiner* — Bentsu Ro
(74) *Attorney, Agent, or Firm* — Maschoff Brennan

(57) ABSTRACT

Method for determining the position of a rotor in a brushless motor or in a stepper motor, said method including the following steps: applying a voltage in at least one powered phase of the motor; measuring, in an unpowered phase of the motor, the voltage induced by mutual inductance between phases; and determining said position and/or the speed of the rotor from said induced voltage.

22 Claims, 12 Drawing Sheets

METHOD AND ARRANGEMENT FOR DETERMINING THE POSITION OF A ROTOR IN A BRUSHLESS MOTOR OR IN STEPPER MOTOR

RELATED APPLICATIONS

The present invention is a continuation of international application PCT/EP2010/062538 filed on Aug. 27, 2010, the contents of which is hereby incorporated by reference. It claims priority from Swiss patent application CH09/01331, filed on Aug. 27, 2009, the contents of which is hereby incorporated by reference.

FIELD OF THE INVENTION

The present invention relates to the field of rotor power supply and the control of the position of the rotor in turning motors, in particular synchronous motors (brushless motor or stepper motor). The present invention relates in particular to a method and arrangement for determining the position of a rotor in such a motor, without using an additional encoder.

PRIOR ART

In order to control in an optimum fashion the power supply of a motor, the rotor position must be known; this rotor position can be obtained with one or several position sensors.

Sensorless technologies based on measuring electric parameters and/or motor parameters that vary according to the rotor's position are also known. These solutions make it possible to do without a sensor.

Traditional sensorless technologies use:
the movement-induced voltage that varies according to the rotor's speed and position; or
self phase-inductances that vary according to the rotor position.

The present invention aims to use another principle to determine the rotor position and to deduce therefrom the speed, acceleration, number of turns performed or even instantaneous torque etc.

To achieve this aim, the invention is based on the observation that the mutual inductance between the windings of the stater vary according to the rotor's angular position. This variation is often small and has little influence on the operation of a motor. It has therefore long been ignored.

Measurements and calculations performed in the frame of the invention have however shown that even very slight variations of mutual inductances according to the rotor position can advantageously been used to determine in an indirect fashion the motor's rotor position.

In an advantageous embodiment, the mutual inductance is determined by measuring the voltage induced by a power supply phase in another power phase.

The present invention thus relates to a method for determining the position of a rotor in a brushless motor or in a stepper motor, including the following steps:
applying a voltage and/or a current in at least one powered phase of the motor;
measuring, in an unpowered phase of the motor, the voltage induced by mutual inductance between phases;
determining said position and/or the speed of the rotor from said induced voltage.

The present invention also relates to an arrangement for determining the position of the rotor and supplying power to a brushless or stepper motor, including:

a switch circuit for selectively and alternatively powering one or several phases of said motor with a voltage and/or a current comprising a high-frequency component;
a voltage detector for measuring the voltage induced in an unpowered phase by reason of the mutual inductance with the powered phases, and for generating a signal representative of said induced voltage;
a processing circuit for computing the rotor's instantaneous position and/or speed from said signal.

In one embodiment, the voltage induced by mutual inductance is measured at two different instants; the method then includes a step of calculating the difference of induced voltage between said two instants. This differential calculation method makes it possible to avoid offset errors and/or errors of the movement-induced voltage component.

Advantageously, the induced voltage is measured a first time during an ON-period when said voltage is applied to the powered phase or phases, and a second time during an OFF-period when said voltage is modified. For example, the induced voltage can be measured at the end of the period when said voltage is applied to the powered phase or phases (ON period), then again at the end of the period when the applied voltage is interrupted or inverted (period OFF).

This measurement principle applies to three-phased motors as well as to two-phased motors. In one embodiment, adapted to a three-phased motor, a voltage and/or a current are applied simultaneously to two powered phases of the motor, and the induced voltage is measured in the third unpowered phase of the motor. In another embodiment adapted to a three-phased motor, a voltage and/or a current are applied simultaneously to a single one of the phases of the motor, and the induced voltage is measured in one of the other unpowered phases of the motor, or in the two other unpowered phases.

In another embodiment adapted to a three-phased motor with neutral, the induced voltage is measured between an unpowered phase and the neutral or a virtual neutral.

The method of the invention can also be adapted to two-phased motors.

In an embodiment adapted to a three-phased motor with or without neutral, a first voltage and/or a first current are applied to a first pair of phases; the voltage induced by mutual inductance in the third unpowered phase of the motor is measured;
a second voltage and/or a second current are then applied to a second pair of phases; the voltage induced by mutual inductance in the unpowered phase of the motor is measured;
the position of the rotor is then determined from the voltage induced in each unpowered phase during the two above steps.

Advantageously, the voltage and/or the current applied to the powered phase, or to the powered phases, is pulse-width modulated (PWM) with ON-periods during which at least one phase is powered, and OFF-periods during which said phases have their power interrupted or inverted. The induced voltage is thus advantageously measured during each ON-period and each OFF-period, wherein the method includes a step of calculating the difference of induced voltage between the ON-period and the OFF-period.

Other advantageous embodiments will appear by reading the description illustrated by the attached drawings in which.

Figure 9:
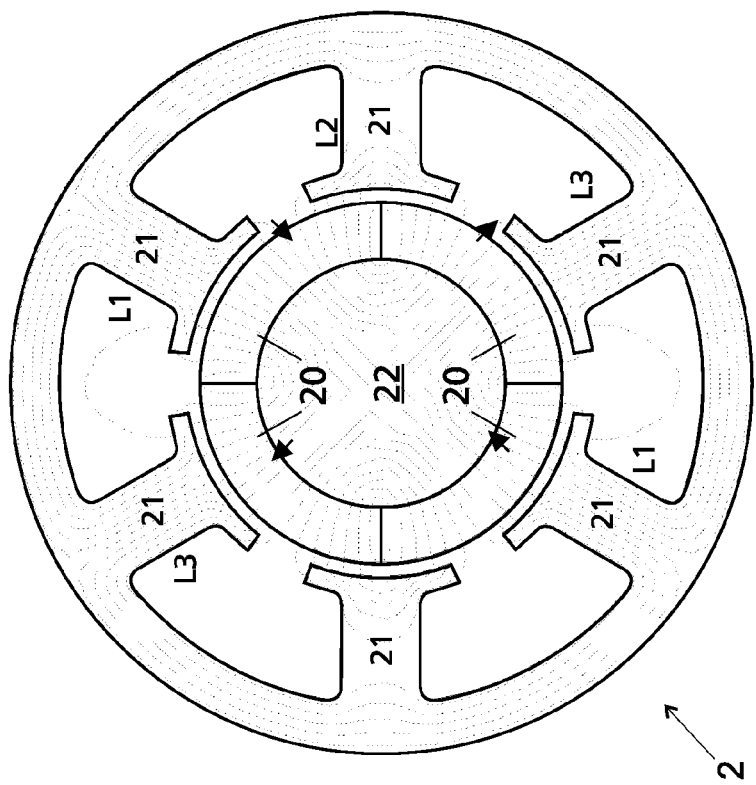

FIG. 9 presents by way of example the structure of a brushless motor with 4 poles and 6 teeth.

Figure 10:
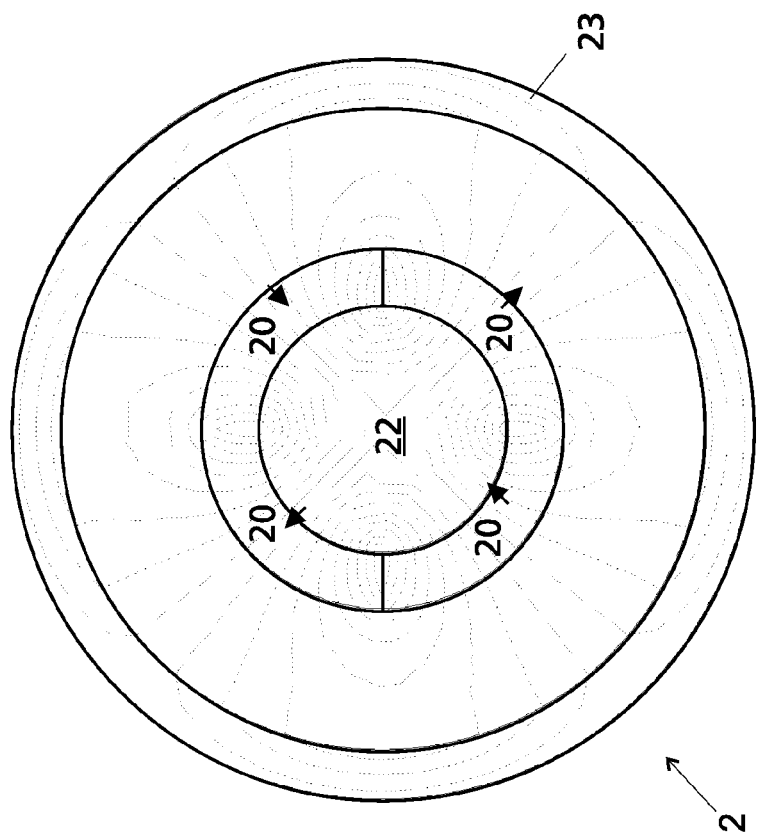

FIG. 10 presents a motor with the winding in the air-gap; the winding is placed in the air-gap without teeth.

Figure 11:
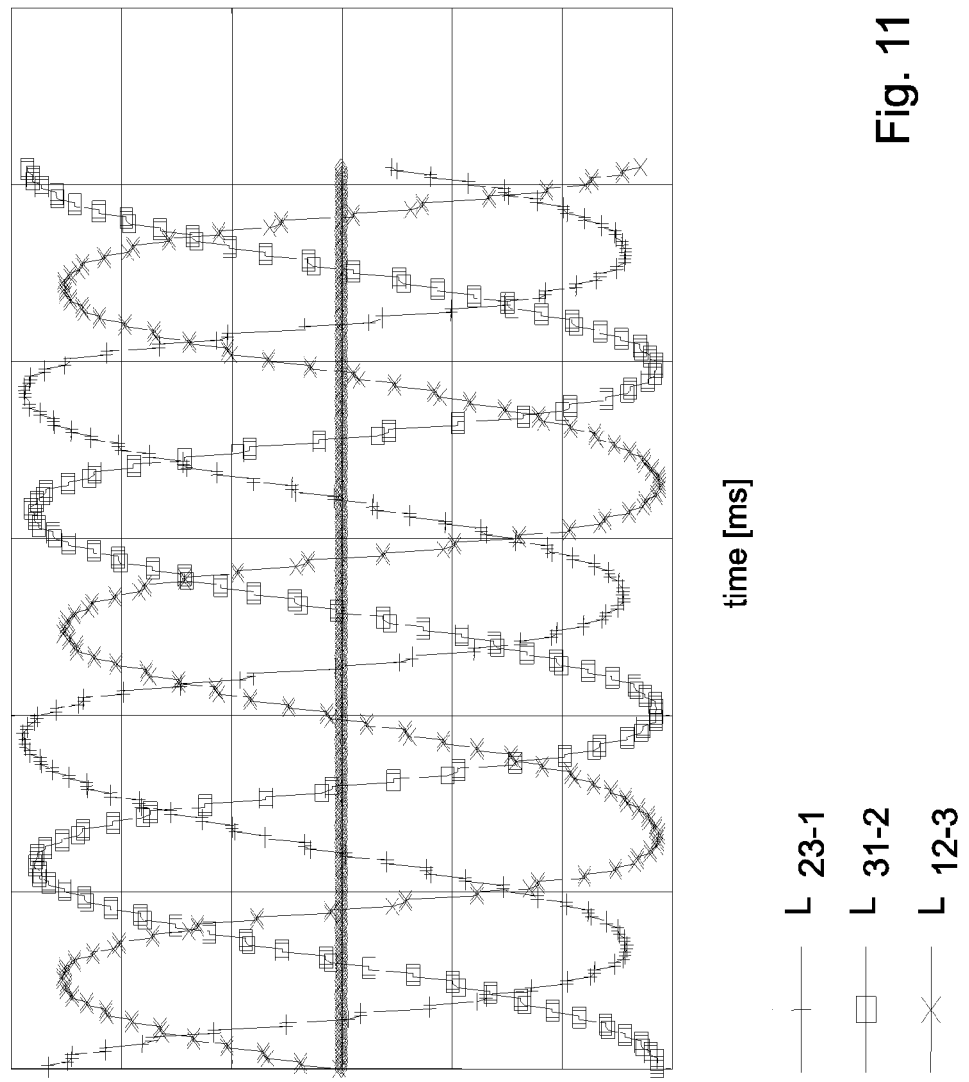

FIG. 11 is a chronogram illustrating the measurement of the mutual inductances L23_1, L31_2 and L12_3 when a three-phased motor of the type of FIG. 9 turns slowly at roughly constant speed.

Figure 12:
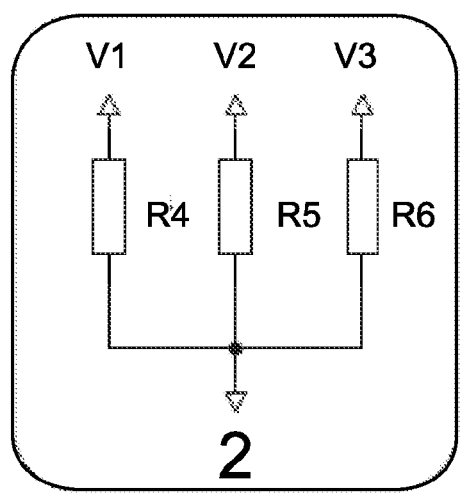

FIG. 12 illustrates a circuit enabling an artificial neutral to be achieved.

EXAMPLES OF EMBODIMENTS

The first embodiment described in relation to FIGS. 1 to 6 applies to a three-phased motor with a conventional 120° commutation and a current limitation by pulse-width modulation (PWM). In this example, the motor 2 is a synchronous motor with permanent magnet with three phases L1, L2, L3 connected in a star. The arrangement also comprises a switch circuit 1 for selectively and alternatively powering the phases of the motor 2 with a voltage and/or a current supplied by a current or voltage source U1. The switch circuit comprises a bridge having 6 transistors T1 to T6.

The current in each of the phases L1 to L3 is regulated by applying a pulse-width modulation (PWM) directly on the transistors T1 to T6. This conventional solution makes it possible to minimize the investment in electronics and makes the best use of the system's components. A modulated voltage and/or a current is applied in each powered phase L1 to L3 of the motor in order to control its speed and/or its torque; the applied tension and current thus include a high-frequency component that depends on the modulation performed.

The speed of the motor is controlled by limiting the current, for example by blocking the transistors in conduction during a variable duration/with a variable cycle ratio, and this at a fixed high frequency. The term "limiting transistor" designates the transistor or transistors whose conduction time is modulated.

Figure 1:
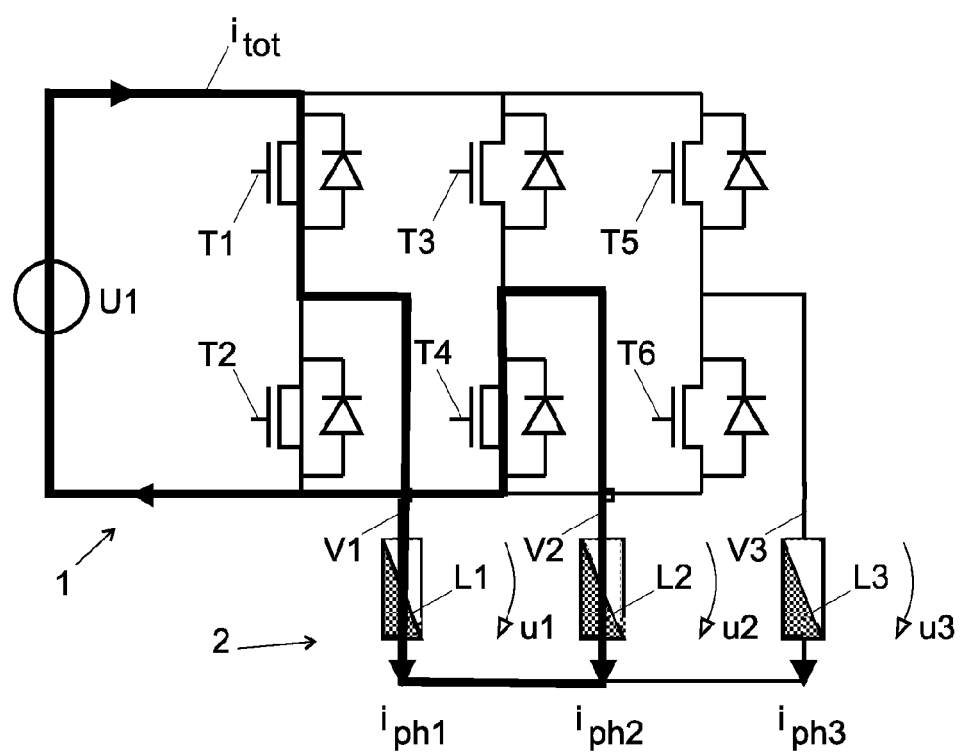
FIG. 1 shows the circuit traveled, by the current in an arrangement comprising a three-phased motor and a switch circuit for selectively and alternatively powering one or several phases of said motor. In the instant illustrated in the FIG., two transistors are in conduction.

FIG. 1 represents one of the six conduction states of the transistors of the bridge corresponding to a commutation sequence at 120°. In this state, the two transistors T1 and T4 are conducting; the other transistors are blocked.

Figure 2:
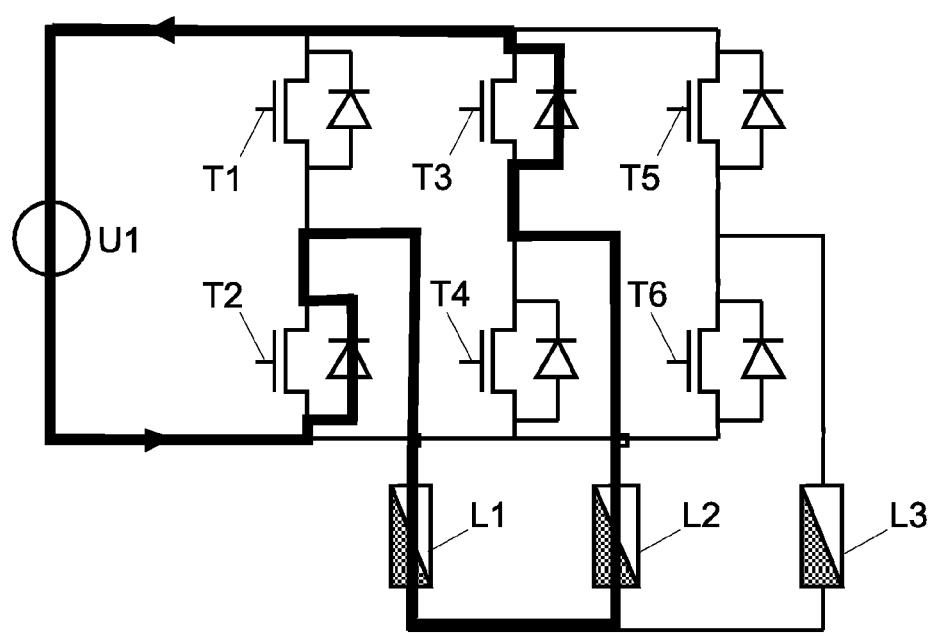
FIG. 2 shows the circuit traveled by the current in the arrangement of FIG. 1, at an instant during which the two transistors are blocked.
Figure 3:
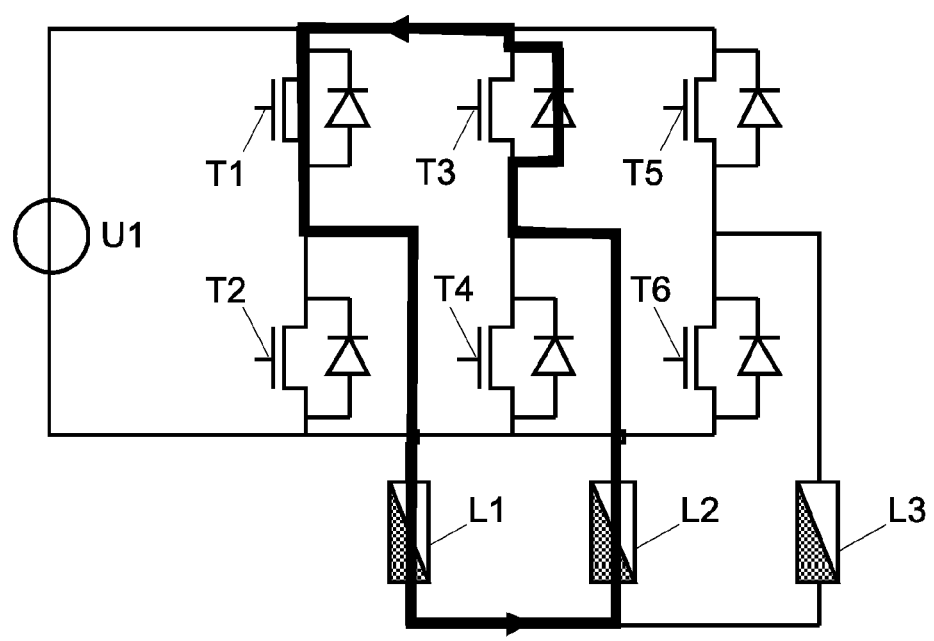
FIG. 3 shows the circuit traveled by the current in the arrangement of FIG. 1, at an instant when one of the two transistors (the lower transistor in the figure) is blocked.

FIG. 2 describes the path traveled, by the current when, starting from the state illustrated in FIG. 1, the two transistors T1 and T4 are blocked. FIG. 3 illustrates this path when only the lower transistor T4 is blocked. The phase current $i_{ph}(t)$ does not change sign and evolves in a continuous manner. The total current $i_{tot}(t)$, however, is discontinuous. It changes sign when the limitation occurs on both transistors T1 and T4 whilst it is cancelled out when a single transistor T4 is blocked.

A third embodiment, not illustrated, is possible, wherein only the upper transistor T1 is used for the limitation.

The switch circuit is thus arranged for powering the three phases L1, L2, L3 of the motor with successive conduction state sequences depending on the pair of conducting transistors at each instant. The switch circuit further makes it possible to modulate/limit the current by blocking the upper transistor (T1 in the example) and/or the lower transistor (T4 in this example).

Figure 4A:
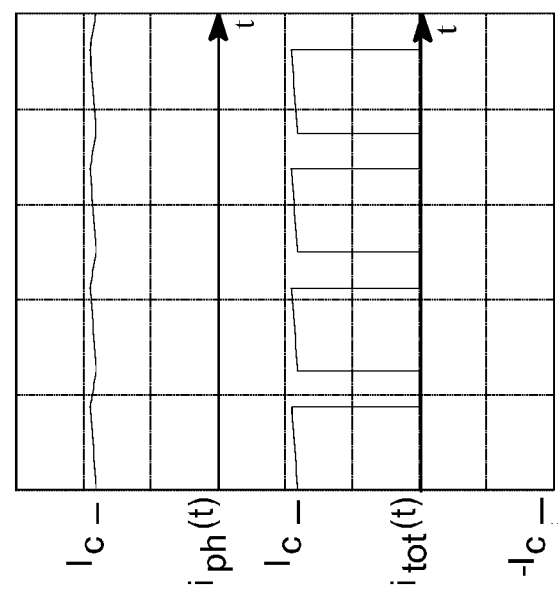
FIG. 4a is a chronogram, showing the manner in which the current can be limited with two transistors.
Figure 4B:
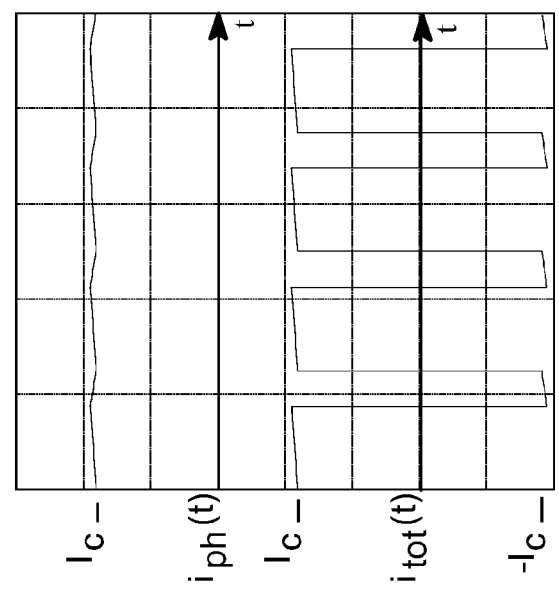
FIG. 4b is a chronogram showing the manner in which the current can be limited with the lower transistor.

FIG. 4a represents the evolution of the total current $i_{tot}(t)$ and that of the phase current $i_{ph}(t)$ for a current control with two limiting transistors, as in the example of FIG. 2. FIG. 4b represents the evolution of the total current, and that of the phase current for a current control with two limiting transistors, as in the example of FIG. 3.

Figure 5:
FIG. 5 is a chronogram showing the evolution in time of the three phase currents.
Figure 6:
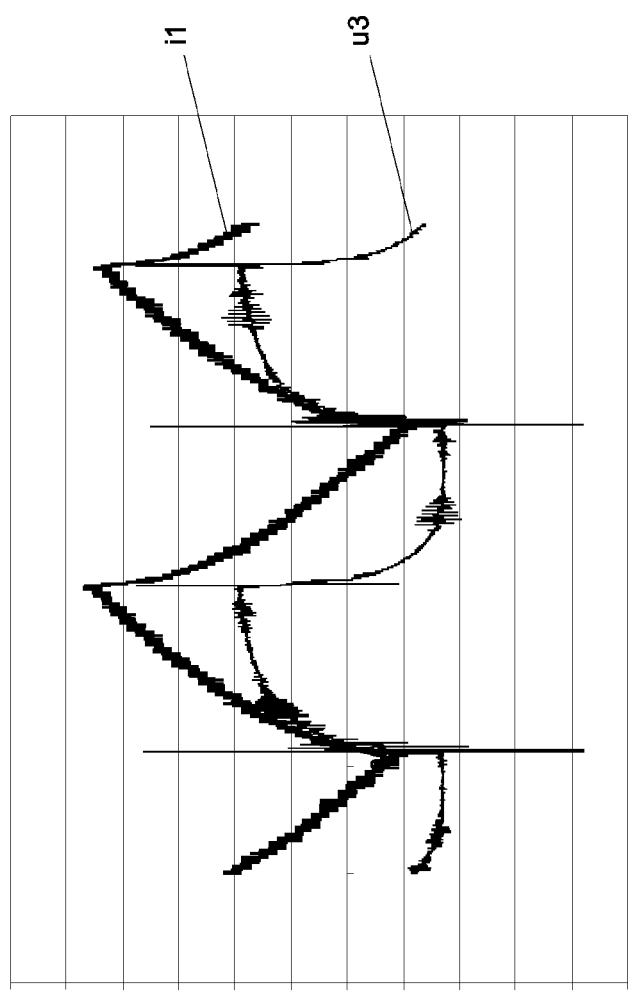
FIG. 6 illustrates the voltage u3 measured at the terminals of the unpowered phase for the stopped motor, when the phases 1 and 2 of the motor are powered serially with a current i1 controlled by pulse-width modulation on two transistors.

FIG. 5 shows the three phase currents phase $i_{ph1}(t)$, $i_{ph2}(t)$ and $i_{ph3}(t)$ that can thus be generated with a sequence of six successive commutation states S1 to S6. For each commutation, one phase will be powered with a positive current, one phase with a negative current and one phase is momentarily not powered. The instants during which a phase is unpowered are illustrated by surrounding them with a rectangle in the figure. This unpowered phase is used for measuring the movement-induced voltage, i.e. the voltage induced by mutual coupling with the other phases. It notably allows the zero crossings by the movement-induced voltage to be detected.

The invention advantageously (but not necessarily) uses this control mode at 120° with current limitation by pulse-width modulation. By way of example, we will consider in FIG. 6 one of the 6 commutation sequences corresponding to the motor's phases 1 and 2 powered serially with a current $i_1$ controlled by pulse-width modulation on 2 transistors.

The lower curve, nearly rectangular, corresponds to the voltage measured at the terminals of the unpowered phase 3 for the stopped motor. The upper sawtooth-shaped curve illustrates the phase current i1, equal in this state to $i_{ph1}$ and to $-i_{ph2}$.

The voltage $u_3$ measured at the terminals of the phase 3 is practically proportional to the differential coefficient of the current ix circulating in the powered phases 1 and 2. This voltage is thus produced by coupling by mutual inductance between the phases 1 and 2, momentarily powered, and the phase 3, momentarily unpowered.

Figure 7:
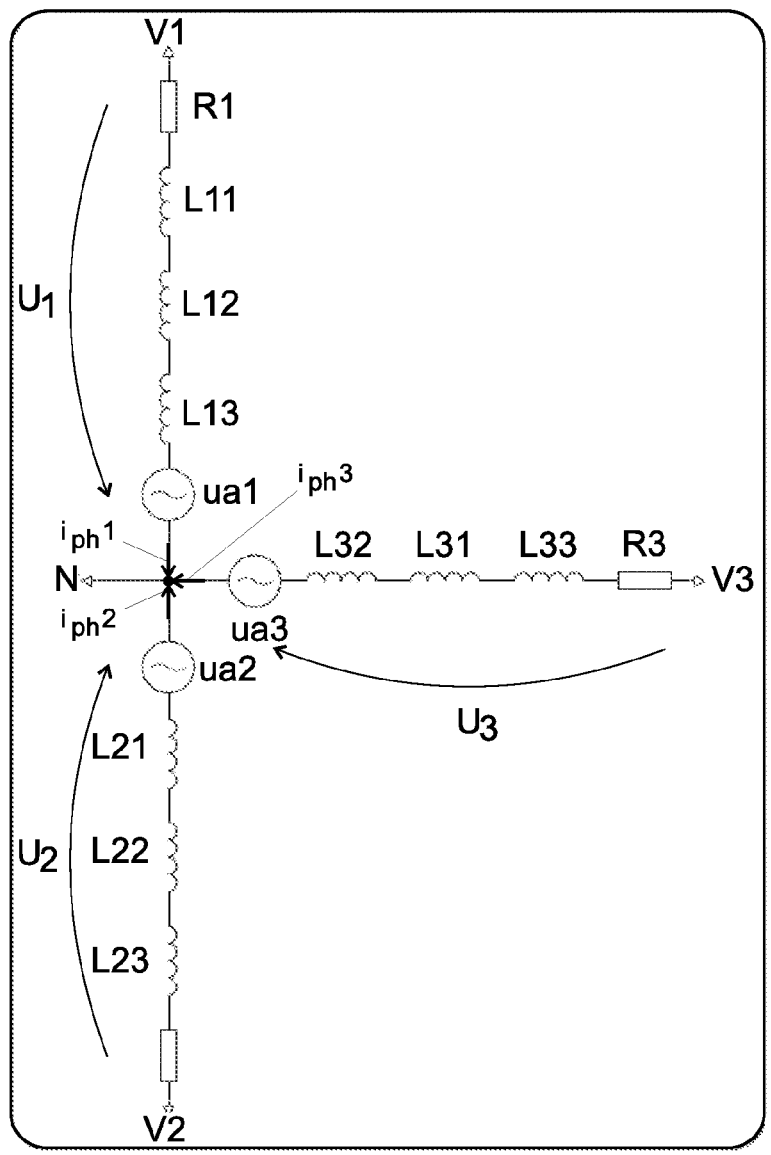
FIG. 7 represents the different elements modeling the phases of the motor, i.e. the phase resistances, self-inductances, mutual inductances between phases and movement-induced voltages for a star coupling.

Forming an equation makes it easier to understand the origin of the measured voltage. FIG. 7 represents the different elements modeling the phases of the motor 2, i.e. the phase resistances R1 to R3, self-inductances Lii, mutual inductances Lij between phases and movement-induced voltages $U_{ai}$ for a star coupling, The voltage $u_3$ on the unpowered phase 3 is the sum of the following components:

$$u_3 = R_3 \cdot i_3 + L_{33} \cdot \frac{di_3}{dt} + L_{31} \cdot \frac{di_1}{dt} + L_{32} \cdot \frac{di_2}{dt} + u_{a3}$$

When phase 3 is unpowered, we have $i_3=0$. The currents $i_{ph1}$ and $i_{ph2}$ injected in the phases 1 and 2 are identical but of opposite values: $i_1=i_{ph2}=-i_{ph1}$. We thus have:

$$u_3 = (L_{31} - L_{32}) \cdot \frac{di_1}{dt} + u_{a3}$$

When stopped, for a speed equaling zero, the induced voltage $u_{a3}$ is zero. When in movement, when the motor is running, it is possible to avoid the movement-induced voltage $u_{a3}$ by calculating the difference of induced voltage at two distinct instants.

Figure 8:
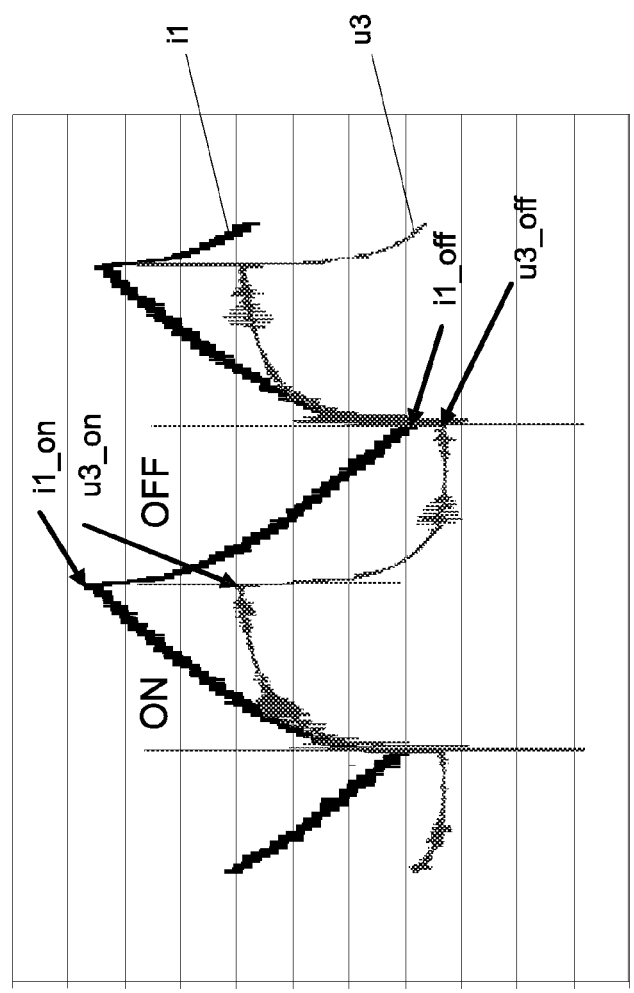
FIG. 8 shows the ON and OFF power periods of the phases 1 and 2 as well as the voltages $u_{3\_on}$ and $u_{3\_off}$ and the currents $i_{1\_on}$ and $i_{1\_OFF}$ in the two powered phases.

In a preferred embodiment, the induced voltage $u_{3\_on}$ or, resp. $u_{3\_off}$ is measured at the terminals of the phase 3 at the end of the ON and OFF periods of phase power supply, then the difference between these two voltages us on and $u_{3\_off}$ is calculated. FIG. 8 shows the ON and OFF periods of powering the phases 1 and 2 as well as the voltages us on and $u_{3\_off}$ and the currents $i_{1\_on}$ and $i_{1\_off}$ in the two powered phases.

During the ON periods, the powered phases (L1 and L2 in FIG. 1) are powered normally through the two transistors (T1 and T4 in the state illustrated in FIG. 1). The voltage U3 on the measurement phase (L3) is almost rectangular and the current $i_1$ through this phase grows in a manner practically proportional to the differential coefficient of the voltage $U_3$ (the motor phases have a behavior of predominantly inductive type).

Following the blocking of one or two transistors at the beginning of the OFF period (transistor T1 and T4 in the example of state in FIG. 2; transistor T4 in the example of FIG. 3), the power supply of the powered phases is modified. As the current cannot stop instantaneously, the diodes allow the current to decrease with a zero voltage (blocking of one transistor) or with an inverted voltage (blocking of two transistors). Consequently, the voltage il decreases during the OFF periods. All the phases powered during the ON period are also powered during the OFF period but with a different voltage value that alters the current's slope. The measurement of the induced voltage on the unpowered phase thus changes between the ON and OFF periods, which makes it possible to obtain two equations for two with two unknown variables.

Therefore, we have:

$$u_{3\_on} = (L_{31} - L_{32}) \cdot \frac{di_1}{dt_{on}} + u_{a3}$$

$$u_{3\_off} = (L_{31} - L_{32}) \cdot \frac{di_1}{dt_{off}} + u_{a3}$$

$$\Delta u_3 = u_{3\_on} - u_{3\_off} = (L_{31} - L_{32}) \cdot \left( \frac{di_1}{dt_{on}} - \frac{di_1}{dt_{off}} \right)$$

We obtain a voltage difference $\Delta u_3$ that no longer depends on the movement-induced voltage $u_{a3}$ but only on the difference between two mutual inductances and on the difference between two differential coefficients of the phase current $i_1$.

The differential coefficients of the phase current $i_1$ during the ON and OFF periods can be estimated theoretically. During the ON period, the phases 1 and 2 are in series with the voltage $U_{dc}$:

$$U_{dc} = (R_1 + R_2) \cdot i_1 + (L_{11} + L_{22} - 2 \cdot L_{12}) \cdot \frac{di_1}{dt} + (u_{a1} - u_{a2})$$

$$\boxed{\frac{di_1}{dt_{on}} = \frac{U_{dc} - (R_1 + R_2) \cdot i_1 - (u_{a1} - u_{a2})}{(L_{11} + L_{22} - 2 \cdot L_{12})}}$$

During the OFF period, on the other hand, the phases 1 and 2 are in series with the voltage $-Udc$:

$$-U_{dc} = (R_1 + R_2) \cdot i_1 + (L_{11} + L_{22} - 2 \cdot L_{12}) \cdot \frac{di_1}{dt} + (u_{a1} - u_{a2})$$

$$\boxed{\frac{di_1}{dt_{off}} = \frac{-U_{dc} - (R_1 + R_2) \cdot i_1 - (u_{a1} - u_{a2})}{(L_{11} + L_{22} - 2 \cdot L_{12})}}$$

The difference between the differential coefficients of ON/OFF current will then yield:

$$\frac{di_1}{dt_{on}} - \frac{di_1}{dt_{off}} = \frac{2 \cdot U_{dc} - (R_1 + R_2) \cdot (i_{1\_on} - i_{1\_off})}{(L_{11} + L_{22} - 2 \cdot L_{12})}$$

and $$\boxed{\Delta u_3 = (L_{31} - L_{32}) \cdot \frac{2 \cdot U_{dc} - (R_1 + R_2) \cdot (i_{1\_on} - i_{1\_off})}{(L_{11} + L_{22} - 2 \cdot L_{12})}}$$

In the case where the current's waveform is weak, the terms $R_1$ can be disregarded:

$$\frac{di_1}{dt_{on}} - \frac{di_1}{dt_{off}} \cong \frac{2 \cdot U_{dc}}{(L_{11} + L_{22} - 2 \cdot L_{12})}$$

and $$\boxed{\Delta u_3 \cong (L_{31} - L_{32}) \cdot \frac{2 \cdot U_{dc}}{(L_{11} + L_{22} - 2 \cdot L_{12})}}$$

The mutual inductance $L_{12\_3}$ is defined as the mutual inductance between the two powered phases 1 and 2 and the unpowered phase 3, which allows us to speak of the variation of mutual inductance rather than of the variation of a difference of mutual inductance:

$$L_{12\_3} = (L_{31} - L_{32})$$

This mutual inductance $L_{12\_3}$ is theoretically zero for a perfectly symmetrical motor. Dissymmetries of the ferromagnetic circuit, introduced for example by local saturation of the iron circuit by the flux created by the permanent magnet, will however introduce a slight coupling between the powered phases and the unpowered phase.

FIG. 9 presents by way of example the structure of a brushless motor with 2 to 4 poles 20 and 6 teeth. For this motor structure, the windings constituting the three phases (L1, L2, 13) are coiled in concentric fashion around each tooth 21. The field lines of the magnetic fluxes created by the rotor magnets are also represented. They show that depending on the position of the rotor 22, the iron circuit will be saturated in a dissymmetrical fashion.

The mutual inductance $L_{12}$ is given by the product of the mutual permeance $\Lambda_{12}$ times/by the number of spires of the phases 1 and 2:

$$L_{12} = N_1 \cdot N_2 \cdot \Lambda_{12}$$

The theoretical calculation of the mutual permeance $\Lambda_{12}$ can for example be performed by determining the flux $\phi_{12}$ created by the phase 1 and which passes through the phase 2, $\theta_1$ being the magnetic potential of phase 1:

$$\Lambda_{12} = \frac{\phi_{12}}{\theta_1}$$

The dissymmetries of the ferromagnetic circuit introduced by the local saturation of the magnetic circuit by the flux created by magnet introduce a slight variation of the flux $\phi_{12}$ depending on the rotor position despite a constant potential $\theta_1$.

FIG. 10 illustrates a motor with the winding in the air-gap. The winding is placed in the air-gap without teeth between the rotor 22 and the stator 23. The same reasoning is applicable to the motors of FIGS. 9 and 10.

Measurements and calculations show that the variation of the mutual inductance between the two powered phases and the unpowered phase varies according to a function close to a sine curve of a double frequency against that of the motor's electrical period. The reverse calculation from a sine curve allows a position to be recalculated with two possible solutions per period of the sine curve. A good a priori knowledge of the previous position and of the speed enables these two solutions to be differentiated.

In the three-phased case, the variation of the mutual inductance between two different combinations of two powered phases and one unpowered phase corresponds to functions close to sine curves phase-shifted by 120°. FIG. 11 illustrates the measurement of the mutual inductances L23_1, L31_2 and L12_3 with the described method when a three-phased motor of the type of FIG. 9 turns slowly at roughly constant speed.

The reverse calculation from sine curves phase-shifted by 120° makes it possible to recalculate a position with a unique solution per period of the sine curve, thus a position relative to 180° electrical of the motor. The control algorithm will advantageously use this aspect by commuting the powered phases in order to measure indirectly the mutual inductances of different combinations of powered/unpowered phases generating torque.

Some motors exhibit variations of mutual inductance further deviating from the sine curve shape. The reverse calculation of the position could take this into account by using standardized tables instead of inverse trigonometric functions. Offsets or dissymmetries can also appear for certain types of motors.

Measurements performed by injecting different levels of current into a motor of the type of FIG. 9 have proved that using a strong current introduces a saturation, sometimes causing a complete period of the mutual inductance to flatten out. Conversely, a low current being injected produces symmetrical mutual inductance curves.

Mutual inductance curves obtained with a high current level are thus non-symmetrical because of saturation. The reverse calculation from, these non-symmetrical mutual inductance curves makes it possible to recalculate a position with a unique solution per electrical period, thus relative to 360° electrical of the motor. The reverse calculation from the non-saturated curves (symmetrical, obtained with a low current level) makes it possible to recalculate a position with a unique solution per electric half-period—thus relative to 180° electrical of the motor. Consequently, it is possible to obtain additional information relating to the rotor's position by taking into account the saturation of the ferromagnetic elements of the motor depending on the intensity of the current injected into the powered phases; this additional information can for example be used for clearing an ambiguity as to the rotor position or for a measurement of the absolute position, It is interesting to observe that self inductances vary little for measurements performed with a low current whilst they can vary rather considerably (for example by a factor of 2) for measurements performed with a significant injected current and a motor highly saturated by the rotor flux, Measurements and tests have also been performed with another three-phased motor of the type of FIG. 10 for three different speeds, demonstrating the validity of the concept.

These calculations and measurements show that for a motor with three or more phases, the difference $\Delta u_3$ measured on the unpowered phase is proportional to the difference between the mutual inductances L31 and L32, i.e. the mutual inductances between the unpowered phase (phase 3) and the total of the powered phases (phases 1 and 2). The differential character enables an amplifiable signal to be obtained even for a small variation of the mutual inductances according to the rotor's position.

The variation of the mutual inductances according to the rotor position can have different causes, the most probable being the saturation of part of the magnetic circuit by the rotor flux. Even a small variation in the permeability introduces a variation of the mutual inductances, which can be used even if it is small. Other sources could however also contribute to the phenomenon, e.g. a variation of the air-gap, a rotor anisotropy or an anisotropy of the rotor magnet, etc.

The difference $\Delta u_3$ further has the advantage of being non-sensitive to the induced voltage. It is proportional to the current's slope, thus to $U_{dc}/Ls$, with Ls=L11−L12=equivalent phase inductance. An additional inductance added serially with each phase (for motors with winding in the air-gap) will reduce the amplitude of the signal but will not affect the measurement of $\Delta u_3$.

It is obvious that instead of measuring the difference of induced voltage $\Delta u_3$ at the terminals of the phase L3, it is also possible to measure the voltage difference at the terminals of any other unpowered phase in a two-phased or three-phased motor: $\Delta u_1$ or $\Delta u_2$ for example. It is also possible in a same arrangement to use in succession the voltage measurement at the terminals of different phases. The values originating from different phases generate phase-shifted signals that enable the position to be computed for example with inverse trigonometric functions (sinus) or standardized tables. It is also possible to use several redundant measurements on one or several phases and to calculate averages for example, or to use the most significant or least noisy difference.

The above equations use the measurement of the voltage $U_1$, $U_2$ and/or $U_3$ at the terminals of the unpowered phase relative to neutral. The principle however remains valid for a voltage measured, relative to an artificial neutral executed with 3 additional resistances R4 to R6 connected in a star between the three phase conductors V1, V2 and V3, in the manner illustrated in FIG. 12.

The principle remains also valid and equivalent for an indirect calculation of the voltage at the terminals of the unpowered phase relative to neutral, wherein the calculation is performed from other measurements such as for example the measurement of phase potentials. Generally, when in the present, application a voltage measurement, of the unpowered phase (or floating phase) is mentioned, indirect measurements in which this voltage is obtained indirectly from other measurements are also included.

Measuring the voltage at the terminals of the floating phase relative to neutral or to an artificial neutral and/or measuring the potential of the unpowered phase (floating phase) is often disturbed by transient phenomena linked to parasitic/stray capacitances that can be absorbed or filtered to use this method most effectively.

The developed equations have considered a three-phased motor connected in a star. The invention is however applicable to a three-phased motor connected in a triangle. It is in fact also possible to calculate the star equivalence of a triangle winding; by measuring the voltages of the unpowered phases relative to an artificial neutral, the driving circuit will not make any difference between a motor connected in a star or in a triangle. Consequently, for a three-phased motor connected in a triangle, the triangle's 3 connection points are the three potentials powered for example by a bridge with 6 transistors. The voltage is then applied to 2 potentials and the 3 phases are powered, one phase being in parallel with 2 serial phases. The third potential (middle point of the two serial phases) is floating.

The equations developed have considered a three-phased motor connected in a star powered by a three-phased bridge. The invention is however applicable to a three-phased, motor with 3 independent phases powered separately by 3 power bridges and enabling a roughly equivalent powering to be reproduced.

The developed equations have considered a three-phased motor connected in a star powered by a three-phased bridge. The invention is however applicable to a motor having more than 3 phases enabling a roughly equivalent powering to be reproduced.

The motor structures presented to illustrate the invention correspond to 4 pole motors with 6 teeth and without teeth. Many other motor configurations with a different number of poles and of teeth can be used with the method and the arrangement of the present invention.

Furthermore., measuring the induced voltage on the unpowered phase can also be performed by injecting on the powered phase or phases a high-frequency signal that is not due to the pulse-width modulation (PWM) of the supply voltage; it is perfectly possible, within the frame of the invention, to add to a low-frequency or non-modulated supply voltage a high-frequency measuring signal, designed only to measure the mutual inductance between phases.

Two-phased Motor

The same process can also be used with a two-phased motor, for example a motor in which the phase 1 is powered with a PWM-controlled current and the induced voltage on the unpowered phase 2 is measured to observe the variation in mutual inductance:

$$u_2 = R_2 \cdot i_2 + L_{22} \cdot \frac{di_2}{dt} + L_{21} \cdot \frac{di_1}{dt} + u_{a2}$$

with $$i_2 = 0$$

Let $$u_2 = L_{21} \cdot \frac{di_1}{dt} + u_{a2}$$

$$u_{2\_on} = L_{21} \cdot \frac{di_1}{dt_{on}} + u_{a2}$$

$$u_{2\_off} = L_{21} \cdot \frac{di_1}{dt_{off}} + u_{a2}$$

$$\boxed{\Delta u_2 = u_{2\_on} - u_{2\_off} = L_{21} \cdot \left( \frac{di_1}{dt_{on}} - \frac{di_1}{dt_{off}} \right)}$$

During the ON period, phase 1 is in series with Udc:

$$U_{dc} = R_1 \cdot i_1 + L_{11} \cdot \frac{di_1}{dt} + u_{a1}$$

$$\boxed{\frac{di_1}{dt_{on}} = \frac{U_{dc} - R_1 \cdot i_1 - u_{a1}}{L_{11}}}$$

During the OFF period, phase 1 is in series with −Udc:

$$-U_{dc} = R_1 \cdot i_1 + L_{11} \cdot \frac{di}{dt} + u_{a1}$$

$$\boxed{\frac{di_1}{dt_{off}} = \frac{-U_{dc} - R_1 \cdot i_1 - u_{a1}}{L_{11}}}$$

$$\frac{di_1}{dt_{on}} - \frac{di_1}{dt_{off}} = \frac{2 \cdot U_{dc} - R_1 \cdot (i_{1\_on} - i_{1\_off})}{L_{11}}$$

$$\boxed{\Delta u_2 = L_{21} \cdot \frac{2 \cdot U_{dc} - R_1 \cdot (i_{1\_on} - i_{1\_off})}{L_{11}}}$$

In the case where the current waveform is weak, the terms Ri can be disregarded:

$$\frac{di_1}{dt_{on}} - \frac{di_1}{dt_{off}} \cong \frac{2 \cdot U_{dc}}{L_{11}}$$

$$\boxed{\Delta u_2 \cong L_{21} \cdot \frac{2 \cdot U_{dc}}{L_{11}}}$$

In a two-phased motor, the calculation of the position is performed depending on the mutual inductances measured. The variation of mutual inductance between a powered phase and an unpowered phase of a two-phased motor-varies according to a function close to a sine curve of a double frequency against that of the motor's electrical period. The reverse calculation from a sine curve allows a position to be recalculated with two possible solutions per period of the sine curve. A good a priori knowledge of the previous position and of the speed enables these two solutions to be differentiated.

In the two-phased case, the two different combinations of the powered phase and the unpowered phase make it possible to measure the same mutual inductance.

The difference $\Delta w_2$ is proportional to the mutual inductance L12. The differential character observed in the three-phased case is not reproduced for the two-phased case. However, for a two-phased motor, the mutual inductance must ideally be zero whilst the local saturation introduces dissymmetries of the iron circuit and a mutual inductance that varies according to the rotor position around a zero value; the results can thus be used.

The variation of the mutual inductances of a two-phased motor can have the same origins as for a three-phased motor, i.e. the saturation of part of the magnetic circuit by the rotor flux (even a small variation in the permeability introducing a variation of the mutual inductances can be used even if it is small), variation of the air-gap, a rotor anisotropy or an anisotropy of the rotor magnet, etc.

Measurements of the variation of mutual inductance between the two phases of a two-phased motor have been performed by powering the phase 1 with a current controlled by pulse-width modulation (PWM) and by measuring the voltage at the terminals of the second unpowered phase for a zero rotational speed. These measurements have made it possible to observe that the signal measured on the unpowered phase is synchronous relative to the differential coefficient of the current's waveform introduced by the PWM and that its amplitude and sign vary according to the rotor position. The analysis of this signal leads to the assertion that for the measured motor, the mutual inductance is close to zero for the equilibrium position corresponding to the torque zero of the powered phase and that the mutual inductance increases when moving away from the equilibrium position with a change of sign depending on whether the displacement occurs in the direction CW or CCW.

The maximum value of the mutual inductance typically corresponds to 3% of self inductance. It is thus small and negligible for the motor's main function, which is to generate torque. The variation of the mutual inductance around a zero value is however interesting to use for determining indirectly the rotor's position. It is very likely due to the local saturation of the iron circuit that introduces dissymmetries into the magnetic circuit and thus introduces a slight coupling between the motor's phases.

The method and arrangement of the invention thus make it possible to determine the rotor's position even when the motor is powered, and without requiring any additional electronic circuit nor modifying the motor's drive unit. Furthermore, the value of the mutual inductances can be measured even at zero speed, when the rotor is stopped.

This method can further be combined with technologies for detecting the rotor position without a sensor, based on detecting the zero crossings of the induced voltage of the unpowered phase for the average to high speed range: both approaches in fact use the measurement of the voltage of the unpowered phase or phases. By calculating a difference or a sum of the voltages measured at the end of the ON and OFF times, it will then be possible to use either the measurement of the mutual inductance or the detection of the zero crossings of the movement-induced voltage, or both together. In one embodiment, the method described here above for measuring the position and/or speed by measuring the mutual inductance is combined with the method based on the variation of self inductances described in European patent application EP2036197, so as to determine the value of the self inductance of the two powered serial phases with PWM and to determine the rotor position on the basis of the mutual inductance between the powered phases and the unpowered phase and/or on the basis of the self inductance of the powered serial phases.

Furthermore, knowing the self inductance ha of the powered phases can be used to improve or correct the calculation of the mutual inductance Lij on the basis of the difference of induced voltage. Using another sensorless technology for measuring the self inductance thus allows the calculation of the difference of induced tension Δu (for example $\Delta u_3$) to be corrected, especially when the self inductance of the powered phases varies.

Other sensorless technologies, for example by reconstituting the induced voltage of the powered phase or phases depending on the applied current(s) and voltage(s), can advantageously be combined to the inventive method to improve the system's performances and the accuracy or reliability of the measurement.

The method described uses a pulse-width modulation (PWM) supply. Different variants of this PWM can be used:
  Modulation by current limitation between two thresholds Imax and Imin.
  Modulation by current limitation with 1 threshold Imax and a given OFF time.
  Modulation by current limitation at a given rate defined by an ON time and an OFF time.

The ON/OFF states can be achieved in different ways with a PWM on 1 or 2 transistors, by engaging or not the transistors in parallel with the freewheel diodes, etc.

Mixed PWM (for example with cycles comprising a first period during which two transistors are ON, followed by a second short period with two transistors OFF, then a third period with a single transistor OFF) can also be used to reduce the current's oscillations.

The method described preferably uses a PWM supply since this method of controlling the current makes it possible to impose in the powered phase or phases an average current generating the useful torque with a higher frequency component enabling the variation of the mutual inductances to be measured according to the rotor position and whose average value is zero and does not generate any torque. More complex power electronics would however also allow a component of the current to be produced to generate torque and a higher frequency component to be produced that is designed solely for measuring the variation of the mutual inductances according to the rotor position. Such approaches would be equivalent as to the results obtained but would make the arrangement more complex; a position control based on the high-frequency components inherent to the PWM driving circuit advantageously uses an existing and necessary function for most motor drivers with current and torque control.

For example, a more complex driving circuit could use decoupling capacitors to measure the various mutual inductances even when the three phases of a three-phased motor are powered simultaneously by torque-generating currents. Using decoupling capacitors would in fact allow higher-frequency current components to be superimposed in certain phases and the response to be measured in the other phases without affecting the torque supplied by the motor in order to deduce the mutual inductance. These higher-frequency current/voltage components injected through decoupling capacitors can be generated by additional power bridges with PWM of higher frequency (typically 250 to 500 kHz) to the PWM used to control the motor currents (which is typically 20 to 40 kHz). By synchronizing the measuring and motor PWMs, a more complex method can be achieved that enables the mutual inductances to be estimated continuously whilst using the method of the present invention described here above.

The method described here above uses a difference of two voltage values measured at the end of the ON and OFF periods of the PWM. It is also possible in the frame of the invention to measure voltages at other instants and to calculate the difference between the voltages measured at these other instants.

It is also possible, even in the case of a three-phased motor, to measure only a voltage value without calculating any differences. In this case, one does not avoid the movement-induced voltage $u_{a3}$. This movement-induced voltage is however zero at idle and can be compensated in another way for non-zero speeds, for example depending on the theoretical knowledge of the rotational speed and of the position of the rotor, The method described for a three-phased motor uses a so-called 120° control with 6 commutation sequences permanently providing an unpowered phase. Variant implementations could use other types of control with commutation sequences powering three phases and only occasionally reverting to sequences with an unpowered floating phase. Such supply systems could use sine commutation, 150° commutation, 180° commutation etc.

In a preferred embodiment, measuring the induced voltage on the unpowered phase is achieved by means of a voltage detector, not represented, for example an analogue-to-digital (A/D) converter converting in real time the voltage at the terminals of an impedance between the phase and neutral into a digital value. This voltage detector-generates a signal representative of the induced voltage, for example a digital signal.

A processing circuit, for example a digital processing circuit based on a processor, a microcontroller or a digital signal processor (DSP), executes a program in order to continuously determine, from, this digital signal, the value of the mutual inductance and/or of the position and/or of the rotor speed. This digital processing circuit, is advantageously designed to calculate inverse trigonometric functions from measurements of the induced voltage on the powered phase or phases, and to deduce therefrom the speed and/or the position. In the case where the variation of mutual inductance is not at least approximately sine-shaped, the digital circuit advantageously uses tables depending on the motor and enabling the motor's position and/or speed to be determined according to measurements of induced voltage, respectively measurements of mutual inductance. The digital circuit can also be used for controlling the switch circuit 1 and the blocking resp. unblocking of the six transistors T1 to T6 constituting the transistor bridge. The control of these transistors can itself depend on the measured induced voltage U3 and on the calculation of the position and/or of the speed, for example in order to execute a closed-loop control circuit enabling the speed and/or the position or the rotor to be forced.

The invention claimed is:

1. Method for determining the position and/or the speed of a rotor in a brushless motor or stepper motor, having the following steps:
   applying a voltage and/or of a current in at least one powered phase of the motor;
   measuring in an unpowered phase of the motor the induced voltage by mutual inductance between phases;
   determining said position and/or speed of the rotor from said induced voltage;
   wherein said voltage and/or said current is pulse-width modulated with periods during which at least one phase is powered through at least one transistor and periods during which at least one said transistor is blocked so as to modify the current in said at least one phase.

2. The method of claim 1, having a step of determining the mutual inductance between the powered phase or phases and the unpowered phase, wherein the instantaneous position of the rotor is determined from said mutual inductance.

3. The method of claim 1, having a step of measuring said voltage induced by mutual inductance at two different instants,
   and a step of calculating the difference of induced voltage between said two instants.

4. The method of claim 3, wherein said induced voltage is measured a first time during a period when said voltage is applied to the powered phase or phases, and a second time during a period when the voltage applied to the powered phase or phases is modified.

5. The method of claim 1, wherein said motor is a three-phased motor,
   wherein said voltage and/or current is applied simultaneously at each instant to said two powered phases of the motor,
   wherein the induced voltage is measured in the third, unpowered phase of the motor.

6. The method of claim 5, wherein said induced voltage is measured between said unpowered phase and neutral or a virtual neutral.

7. The method of claim 6, including:
   a) the application of said voltage and/or of said current to a first pair of phases and the measurement, in the third, unpowered phase of the motor, of the voltage induced by mutual inductance;
   b) the application of a second voltage and/or of a second current to said first pair of phases and the measurement, in said unpowered phase of the motor, of the voltage induced by mutual inductance;
   c) determining said position of the rotor from said induced voltage in said unpowered phase during the steps a) and b).

8. The method of claim 6, including:
   a) the application of said voltage and/or of said current to a first pair of phases and the measurement, in the third, unpowered phase of the motor, of the voltage induced by mutual inductance;
   b) the application of a second voltage and/or of a second current to a second pair of phases and the measurement, in the unpowered phase of the motor, of the voltage induced by mutual inductance;
   c) determining said position of the rotor from said induced voltage in said unpowered phase during the steps a) and b).

9. The method of claim 1, wherein said induced voltage is measured during each period (ON) when said phase is powered and during each period (OFF) when said transistor is blocked, wherein the method includes a step of calculating the difference of induced voltage measured during each of said periods (ON and OFF).

10. The method of claim 1, wherein said motor is powered by a switch circuit comprising a three-phased bridge with six transistors.

11. The method of claim 1, wherein said motor is a two-phased motor,
    said voltage and/or said current being applied to a powered phase of the motor,
    the induced voltage being measured in the unpowered phase of the motor.

12. The method of claim 1, comprising a step of determining the instants when the phases are powered and/or determining the supply current according to said position and/or speed.

13. The method of claim 1, wherein said mutual inductance varies in an approximately sine curve-shaped manner,
    and wherein the position of said rotor is determined by calculating inverse trigonometric functions.

14. The method of claim 1, wherein the position of said rotor is determined from the variations of said mutual inductance with the aid of standardized tables.

15. The method of claim 1, having a step of filtering or absorbing the measurement of the potential of the unpowered phase in order to reduce the disturbances linked to parasitic/stray capacitances.

16. The method of claim 1, comprising a step of injecting a high-frequency signal on one of the phases of the motor and the measurement of the voltage induced by said high-frequency signal on at least one other phase of said motor.

17. The method of claim 1, further having a step of detecting the zero crossing of the movement-induced voltage, wherein determining said position and/or said speed is based both on the measurement of said mutual inductance between phases and on said detection of the zero crossing of the movement-induced voltage.

18. The method of claim 1, having a step of determining the saturation of the ferromagnetic elements of the motor, this information being used for determining said position and/or said speed.

19. The method of claim 1, having a step of determining the variation of mutual and/or self inductances depending on the intensity of the current.

20. Computer data carrier containing a computer program that can be executed by a processor to execute the method of claim 1.

21. Arrangement for determining the position of a rotor and for powering a brushless or stepper motor, having:
- a switch circuit for selectively and alternatively powering one or several phases of said motor with a voltage and/or a current comprising a high-frequency component;
- a voltage detector for measuring the voltage induced in an unpowered phase by reason of the mutual inductance with the powered phases, and for generating a signal representative of said induced voltage;
- a processing circuit for calculating the rotor's instantaneous position and/or speed from said signal;
- wherein said voltage and/or said current is pulse-width modulated with periods during which at least one phase is powered through at least one transistor and periods during which at least one said transistor is blocked so as to modify the current in said at least one phase.

22. The arrangement of claim 21, wherein said processing circuit is arranged for implementing the method of claim 1.

* * * * *